United States Patent

Shirochi et al.

[11] Patent Number: 5,879,065
[45] Date of Patent: Mar. 9, 1999

[54] IMAGE PROJECTING APPARATUS

[75] Inventors: Yoshiki Shirochi, Chiba; Naoki Kamaya, Tokyo, both of Japan

[73] Assignee: Sony Corporation, Japan

[21] Appl. No.: 882,265

[22] Filed: Jun. 25, 1997

[30] Foreign Application Priority Data

Jul. 10, 1996 [JP] Japan .................................. 8-180257

[51] Int. Cl.⁶ ................................................ G03B 21/14
[52] U.S. Cl. ................................. 353/8; 353/20; 353/31; 349/9; 359/465
[58] Field of Search ............................... 353/8, 7, 20, 31, 353/33, 34, 37; 349/9; 359/464, 465; 348/52, 58, 60, 43, 44, 57

[56] References Cited

U.S. PATENT DOCUMENTS

| | | | |
|---|---|---|---|
| 5,074,645 | 12/1991 | Gold et al. | 359/465 |
| 5,552,840 | 9/1996 | Ishii et al. | 359/465 |
| 5,555,035 | 9/1996 | Mead et al. | 353/34 |
| 5,564,810 | 10/1996 | Larson | 353/31 |
| 5,565,933 | 10/1996 | Reinsch | 353/31 |
| 5,575,548 | 11/1996 | Lee | 353/34 |

*Primary Examiner*—William Dowling
*Attorney, Agent, or Firm*—Ronald P. Kananen; Rader, Fishman & Grauer

[57] ABSTRACT

An image projecting apparatus is so constructed as to generate a stereoscopic-image signal having images for right and left eyes alternatively arranged for each field, decompose an image produced by the stereoscopic-image signal into lights with predetermined components, divide the lights into first and second groups, assign the first group to a first polarized light having the directions of polarization different from each other for each period of a video field, assign the second group to a second polarized light having the directions of polarization different from each other for each period of a video field and having a direction of polarization different from that of the first polarized light, and project the first and second polarized lights, the second polarized light being delayed by one video field with respect to the first polarized light.

17 Claims, 12 Drawing Sheets

IMAGE PROJECTING APPARATUS

BACKGROUND OF THE INVENTION

The present invention relates to an image projecting apparatus for projecting on a screen images for right and left eyes, which are different in the direction of polarization, and can stereoscopically be seen with polarizing glasses.

FIGS. 12–13 shows image projecting apparatus for showing a stereoscopic image. The image projecting apparatus as shown in FIG. 12 is constructed such that right and left images for right and left eyes recorded on two video discs or video cassettes are reproduced by simultaneously starting two players 122, 121, which are projected on the same screen 125 through two video projectors 124, 123 subjected to cross or circular polarization in accordance with the right and left images. When seeing the projected right and left images separately by right and left eyes with polarizing glasses 126 subjected to cross or circular polarization in accordance with the right and left images, a stereoscopic vision is obtained.

The image projecting apparatus as shown in FIG. 13 serves to reproduce images recorded on VHD video discs. Referring to FIG. 13, right and left images recorded on a VHD video disc for each field are reproduced by a VHD player 127, which are projected on a screen 125 by a single projector 128. On the other hand, shuttered glasses 130 are alternatively shaded for each field under control of the VHD player through an adaptor 129 so that the right and left images are always seen by right and left eyes, respectively, achieving a stereoscopic vision.

With the image projecting apparatus as shown in FIG. 12, however, there arise problems that a need of a pair of laser discs or video cassettes, etc. restricts applicable video software, and that a need of two players and two projectors and that of reproducing the players in synchronism with each other result in specialized form and enlarged size of the apparatus. Moreover, the direction of projection, zoom ratio, focusing, etc. of the two projectors should be adjusted separately to obtain on the screen the projected images with the same or slightly different size, which constitutes a complicated work.

On the other hand, with the image projecting apparatus as shown in FIG. 13, a need of the shuttered glasses causes a complicated structure and an increased cost of the apparatus.

It is, therefore, an object of the present invention to provide an image projecting apparatus which is simple and small in structure, and can project right and left images from which a stereoscopic vision is obtained when seen with simple polarizing glasses.

SUMMARY OF THE INVENTION

According to one aspect of the present invention, there is provided an image projecting apparatus, comprising:

means for generating a stereoscopic-image signal having images for right and left eyes alternatively arranged for each video field said image signal;

means responsive to said generating means for decomposing an image produced by said stereoscopic-image signal into lights with predetermined components;

means responsive to said decomposing means for dividing said lights into first and second groups;

means responsive to said dividing means for assigning said first group to a first polarized light having directions of polarization different from each other for each period of said field;

means responsive to said assigning means for assigning said second group to a second polarized light having said directions of polarization different from each other for each period of said field and having a direction of polarization different from that of said first polarized light; and means responsive to said two assigning means for projecting said first and second polarized lights, said second polarized light being delayed by one field with respect to said first polarized light.

Another aspect of the present invention lies in providing an image projecting apparatus, comprising:

means for generating a two-dimensional signal having an image arranged for each video field of said signal;

means responsive to said generating means for decomposing an image produced by said two-dimensional signal into lights with first and second images transversely offset with each other on a screen and constituting images for pseudo right and left eyes alternatively switched for each field;

means responsive to said decomposing means for assigning first image to a first polarized light having directions of polarization different from each other for each period of said field;

means responsive to said assigning means for assigning said second image to a second polarized light having said directions of polarization different from each other for each period of said field and having a direction of polarization different from that of said first polarized light; and means responsive to said two assigning means for projecting said first and second polarized lights, said second polarized light being delayed by one field with respect to said first polarized light.

Still another aspect of the present invention lies in providing a method of projecting an image, comprising the steps of:

generating a stereoscopic-image signal having images for right and left eyes alternatively arranged for each video field of said image signal;

decomposing an image produced by said stereoscopic-image signal into lights with predetermined components;

dividing said lights into first and second groups;

assigning said first group to a first polarized light having directions of polarization different from each other for each period of said field;

assigning said second group to a second polarized light having said directions of polarization different from each other for each period of said field and having a direction of polarization different from that of said first polarized light; and projecting said first and second polarized lights, said second polarized light being delayed by one field with respect to said first polarized light.

A further aspect of the present invention lies in providing a method of projecting an image on a screen, comprising the steps of:

generating a two-dimensional signal having an image arranged for each video field of said signal;

decomposing an image produced by said two-dimensional signal into lights with first and second images transversely offset with each other on the screen and constituting images for pseudo right and left eyes alternatively switched for each field;

assigning first image to a first polarized light having directions of polarization different from each other for each period of said field;

assigning said second image to a second polarized light having said directions of polarization different from each other for each period of said field and having a direction of polarization different from that of said first polarized light; and projecting said first and second polarized lights, said second polarized light being delayed by one field with respect to said first polarized light.

BRIEF DESCRIPTION OF THE DRAWINGS

FIG. 5D is a view similar to FIG. 5C, showing two images on the right and left screens with a predetermined offset amount;

DETAILED DESCRIPTION OF THE INVENTION

Figure 1:
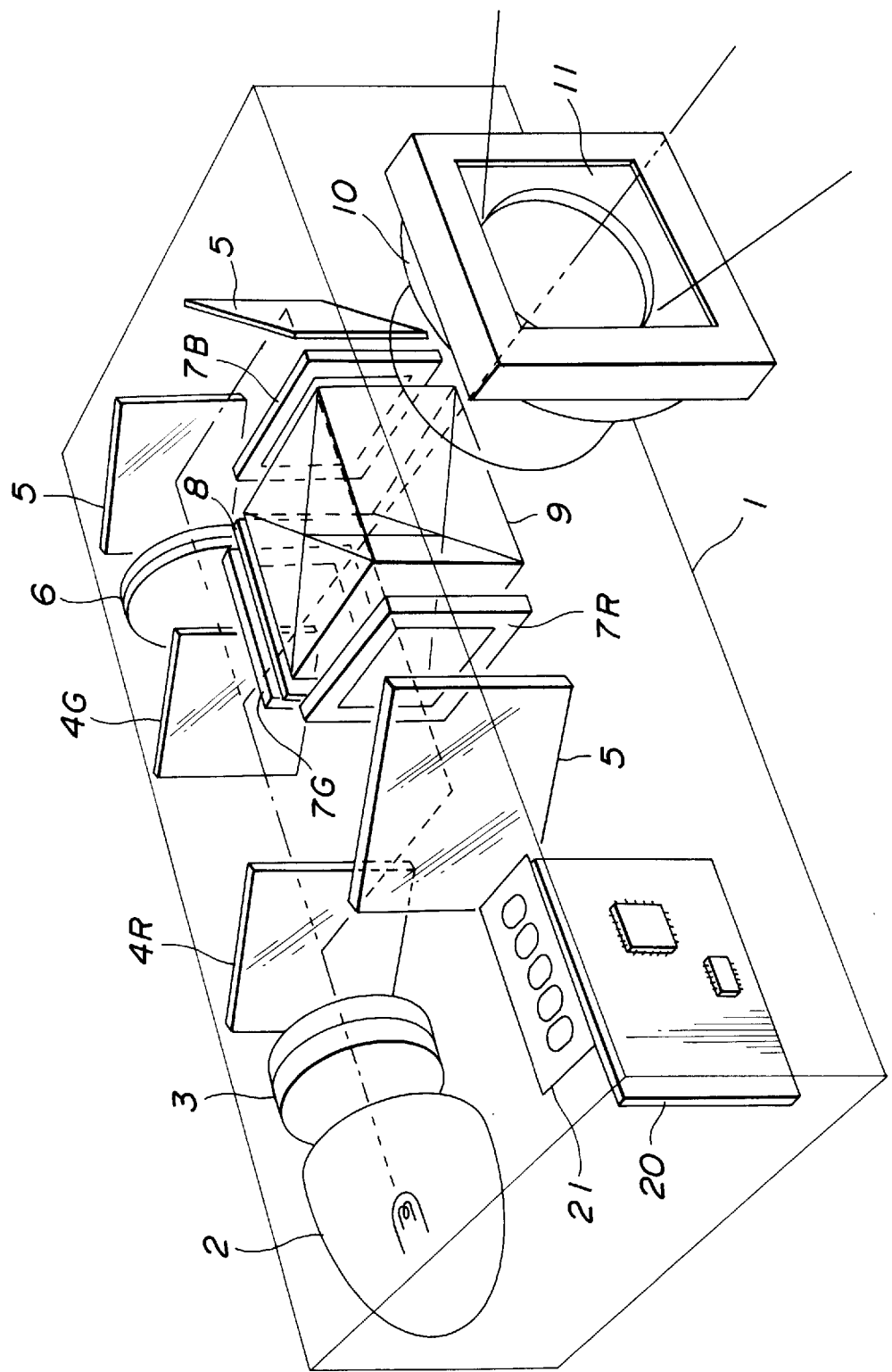
FIG. 1 is a perspective view showing a first embodiment of an image projecting apparatus according to the present invention.

Referring to the drawings wherein like reference numerals designate like parts throughout the views, a description will be made with regard to preferred embodiments of an image projecting apparatus according to the present invention.

FIGS. 1–6 show a first embodiment of the present invention. Referring to FIG. 1, an image projecting apparatus 1 comprises a lamp 2 with reflecting mirror, a lens array 3, a pair of dichroic mirrors 4R, 4G, three plane reflecting mirrors or plates 5, a lens 6, three liquid-crystal display boards 7R, 7G, 7B, a half-wavelength plate 8, a dichroic prism 9, a projecting lens 10, and a ferroelectric liquid crystal (FLC) 11. Each of the liquid-crystal display boards 7R, 7G, 7B is arranged between two polarizing plates, not shown. The incident-side polarizing plate lets only transverse linear polarized light through, whereas the outgoing-side polarizing plate lets only longitudinal linear polarized light through. Each of the liquid-crystal display boards 7R, 7G, 7B is constructed such that, when no voltage is applied thereto, a plane of polarization of incident light is rotated by 90° to let light through. When driven with normally-black, the two polarizing plates are disposed to have the directions of polarization parallel to each other. The half-wavelength plate 8 serves to rotate the direction of polarization of incident light by 90°.

The image projecting apparatus 1 further comprises a substrate 20 which constitutes an electric circuit as will be described below, and an operation part 21 arranged on the top thereof.

Figure 2:
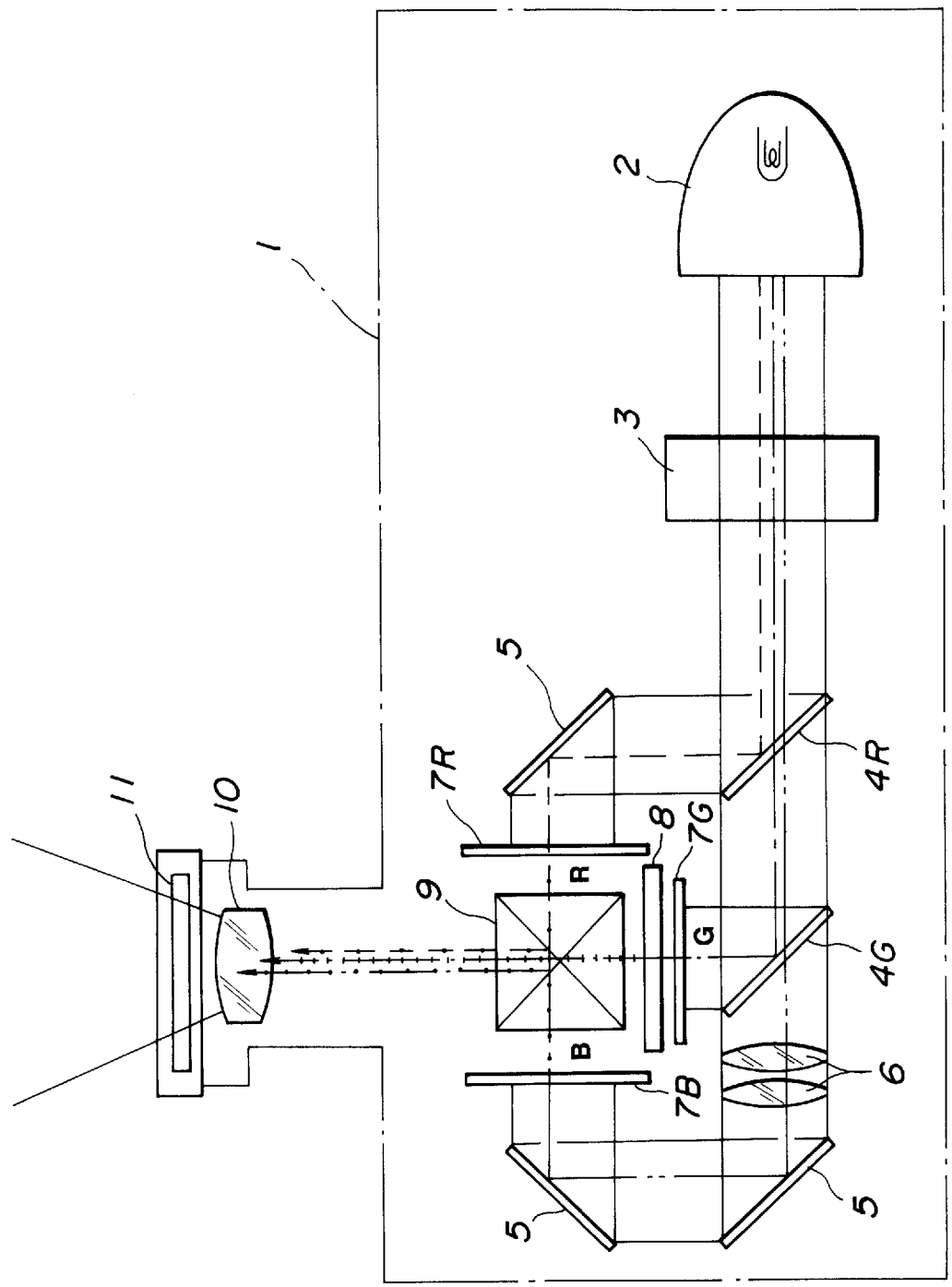
FIG. 2 is a schematic view showing an optical arrangement of the image projecting apparatus.

Referring to FIG. 2, light emitted from the lamp 2 with reflecting mirror passes through the lens array 3 to form parallel light, which is incident on the dichroic mirror 4R which reflects only a red component, and lets the other components through. Reflected red light is incident on the liquid-crystal display board 7R through the plane reflecting mirror 5.

Light which passed through the dichroic mirror 4R is then incident on the dichroic mirror 4G which reflects a green component, and lets only a blue component through. Reflected green light is incident on the liquid-crystal display board 7G. After passing through the dichroic mirror 4G, blue light is shaped in parallel light again, which is incident on the liquid-crystal display board 7B through the two plane reflecting mirrors 5.

Light which passed through the liquid-crystal display boards 7R, 7B forms red and blue image projecting light corresponding to longitudinal linear polarized light. Light which passed through the liquid-crystal display board 7G forms green image projecting light corresponding to longitudinal linear polarized light, the direction of polarization of which is rotated by 90° by the half-wavelength plate 8 to obtain transverse linear polarized light. This is due to the fact that the dichroic prism 9 lets transverse linear polarized light through easily, and reflects longitudinal linear polarized light easily.

Projecting lights united by the dichroic prism 9 are projected on the screen 12 (see FIG. 3) through the projecting lens 10. The FLC 11 arranged in front of the projecting lens 10 is repeatedly turned on and off for each field to allow repeated projection of the entirety of projecting light for each video field with the direction of polarization not changed or 90° rotated. The surface of the screen 12 is coated with, e.g. silver, to reflect projecting light without changing the direction of polarization.

Figure 3:
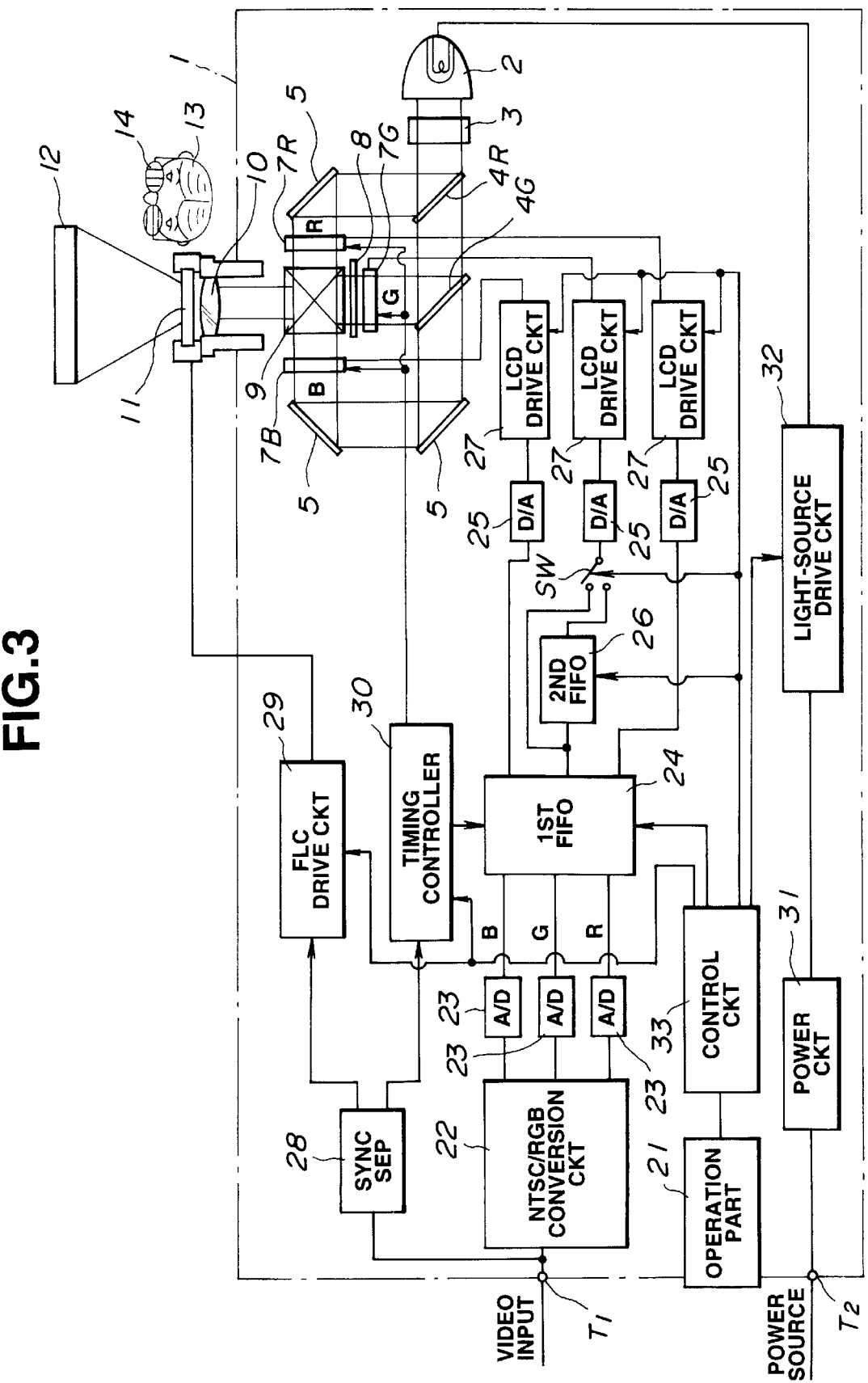
FIG. 3 is a block diagram showing an electric circuit of the image projecting apparatus.

Referring to FIG. 3, an image signal input to a video input terminal $T_1$ is provided to an NTSC/RGB conversion circuit 22 wherein it is converted into signals for three colors of red (R), green (G), and blue (B). The color signals are input to a first fast-in fast-out memory (FIFO) 24 through A/D converters 23 for temporary storage. A control circuit 33 controls read and write of the first FIFO 24. The R and B color signals output from the first FIFO 24 are directly provided to D/A converters 25, whereas the G color signal output from the first FIFO 24 is provided to the D/A converter 25 by one of the two routes, i.e. through a second FIFO 26 or directly without passing through the second FIFO 26, which can be selected by a selector switch SW. The control circuit 33 also controls read and write of the second FIFO 26, and the selector switch SW. The color signals reconverted into analog signals by the D/A converters 25 are provided to LCD drive circuits 27 which drive in accordance therewith the liquid-crystal display boards 7R, 7G, 7B, respectively.

Moreover, the image signal input to the video input terminal $T_1$ is provided to a synchronous separation circuit 28 which separates synchronous signals H, V from the image signal, which are provided to an FLC drive circuit 29 and a timing controller 30, respectively. The FLC drive circuit 29 turns on and off the FLC 11 in accordance with a timing of the synchronous signal V. The timing controller 30 controls the liquid-crystal display boards 7R, 7G, 7B in accordance with a timing of the synchronous signal H, and outputs to the first FIFO 24 a clock signal synchronized with the synchronous signals V, H.

Power input to a power-source terminal $T_2$ is provided to a power circuit 31 wherein it is regulated to a predetermined level of DC voltage, which is provided to divers circuits including a light-source drive circuit 32. The light-source drive circuit 32 turns on the lamp 2 with reflecting mirror under control of the control circuit 33.

On the other hand, command signals derived from the operation part 21 are provided to the control circuit 33 which controls in accordance therewith the first and second FIFOs 24, 26, the selector switch SW, the FLC drive circuit 29, etc. A concrete content of this control will be described below in connection with the operation of the first embodiment.

The operation of the first embodiment will be described. When inputting a stereoscopic-image signal having images for right and left eyes alternatively arranged for each video field, i.e. a field sequential stereoscopic-image signal so called, an operator selects a stereoscopic-image mode with the operation part 21. Then, the control circuit 33 controls the first FIFO 24 to output an input signal with no delay, and the second FIFO 26 to output the input signal with delay of a period of one video field. The control circuit 33 also controls the selector switch SW to select the route of the second FIFO 26. The input stereoscopic-image signal is divided into three or R, G, and B color signals by the NTSC/RGB conversion circuit 22, which are input to the second FIFO 26 to delay only the G color signal by one video field. The R, G, and B color signals processed in such a way are converted into projecting light by the liquid-crystal display boards 7R, 7G, 7B, which is projected by the FLC 11 for each video field with the direction of polarization not changed or rotated by 90°.

Figure 4:
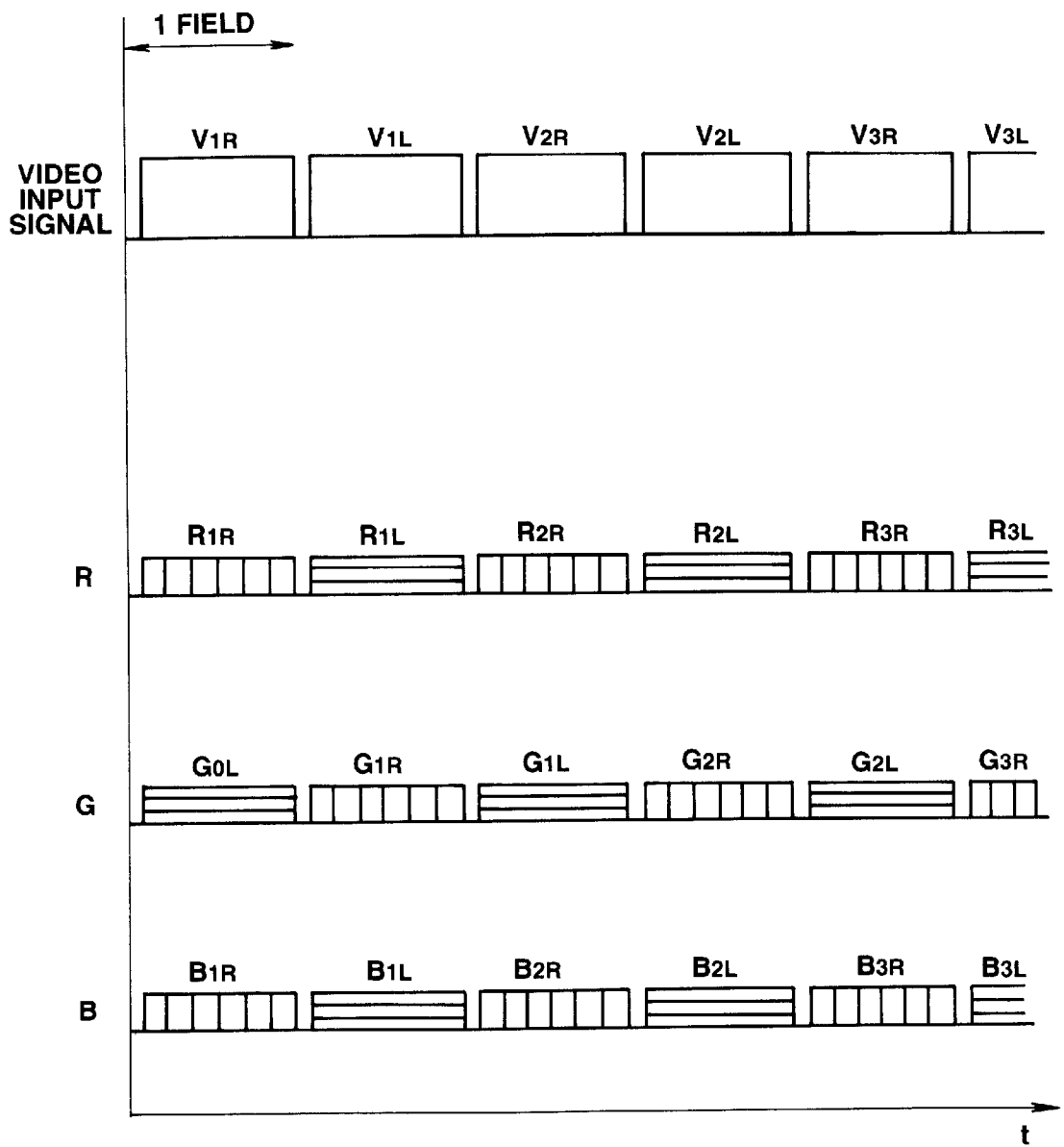
FIG. 4 diagrammatic view showing a projecting timing and a polarization of projecting light.

FIG. 4 shows a projection timing and a polarization of projecting light. Referring to FIG. 4, lines in cells correspond to the direction of polarization of projecting light. Lenses of polarizing glasses 14 allow a viewer 13 who is seeing the screen 12 as shown in FIG. 3 to see longitudinal polarized light by the right eye, and transverse polarized light by the left eye.

Thus, referring to FIG. 4, in a first video field, the right eye can see $R_{1R}$ and $B_{1R}$, and the left eye can see $G_{OL}$.

In a second video field, the right eye can see $G_{1R}$, and the left eye can see $R_{1L}$ and $B_{1L}$.

In a third video field, the right eye can see $R_{2R}$ and $B_{2R}$, and the left eye can see $G_{1L}$.

In a fourth video field, the right eye can see $G_{2R}$, and the left eye can see $R_{2L}$, and $B_{2L}$.

In a fifth video field, the right eye can see $R_{3R}$ and $B_{3R}$, and the left eye can see $G_{2L}$.

That is, the right eye can see R and B components in the first video field, a G component in the second video field, and so on, i.e. images for right eye in a time shared way. Likewise, the left eye can see images for left eye in a time shared way.

Without the second FIFO 26, the R, G, and B components are projected simultaneously, so that, in the first video field, for example, the right eye can see $R_{1R}$ and $B_{1R}$, and the left eye can see $G_{1R}$. That is, the left eye can see the G component of an image to be seen by the right eye only, obtaining no stereoscopic vision.

As described above, according to the first embodiment, when inputting a field sequential stereoscopic-image signal, images for right and left eyes are displayed in a time shared way by the color signals. Thus, in spite of using the image projecting apparatus which gives projecting light composed of two linear polarized lights perpendicular to each other, the right eye can see an image for right eye, and the left eye can see an image for left eye with less flicker.

Next, the realization of a pseudo-stereoscopic vision will be described. The pseudo-stereoscopic vision is a two-dimensional image with pseudo-stereoscopic effect obtained in a method of obtaining a pseudo-stereoscopic vision using a three-dimensional stereoscopic apparatus which allows materialization of a pseudo-stereoscopic vision by seeing two-dimensional images for right and left eyes by right and left eyes, respectively. Specifically, this two-dimensional image is obtained by converting an ordinary two-dimensional image signal into two image signals only transversely shifted to obtain images on a screen of the apparatus in the positions separated from each other by a predetermined distance, and by inputting them to the apparatus as image signals for right and left eyes.

When inputting a two-dimensional image signal having an ordinary image arranged for each video field, the operator selects a pseudo-stereoscopic-image mode with the operation part 21. Then, the control circuit 33 controls the first FIFO 24 so that an input signal produces images transversely offset with each other on the screen 12 as will be described below and constituting images for pseudo right and left eyes alternatively switched for each video field, and the second FIFO 26 to output the input signal with delay of a period of one video field. The control circuit 33 also controls the selector switch SW to select the route of the second FIFO 26.

Figure 5A:
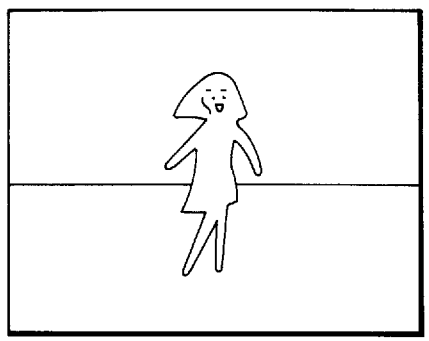
FIG. 5A is a view similar to FIG. 2, showing a content of an image produced by an image signal for one field.
Figure 5B:
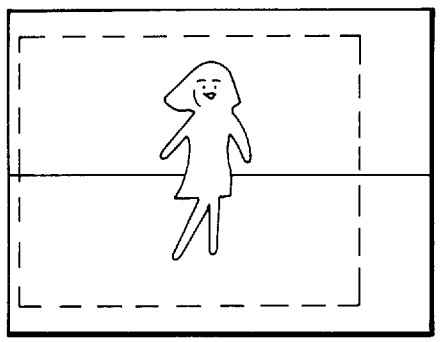
FIG. 5B is a view similar to FIG. 5A, showing the area of the image partly cut out to obtain an image on a right screen.
Figure 5C:
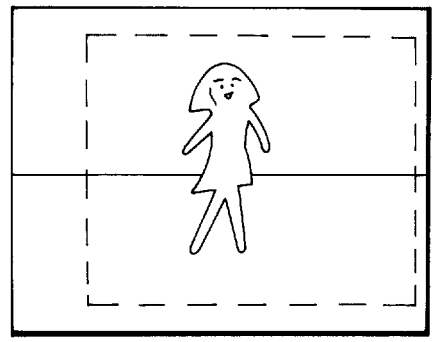
FIG. 5D is a view similar to FIG. 5B, showing the area of the image partly cut out to obtain an image on a left screen.
Figure 5D:
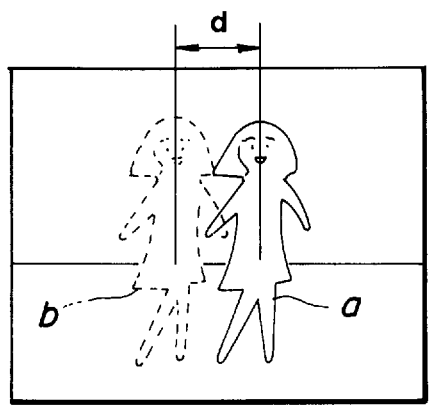
Figure 6:
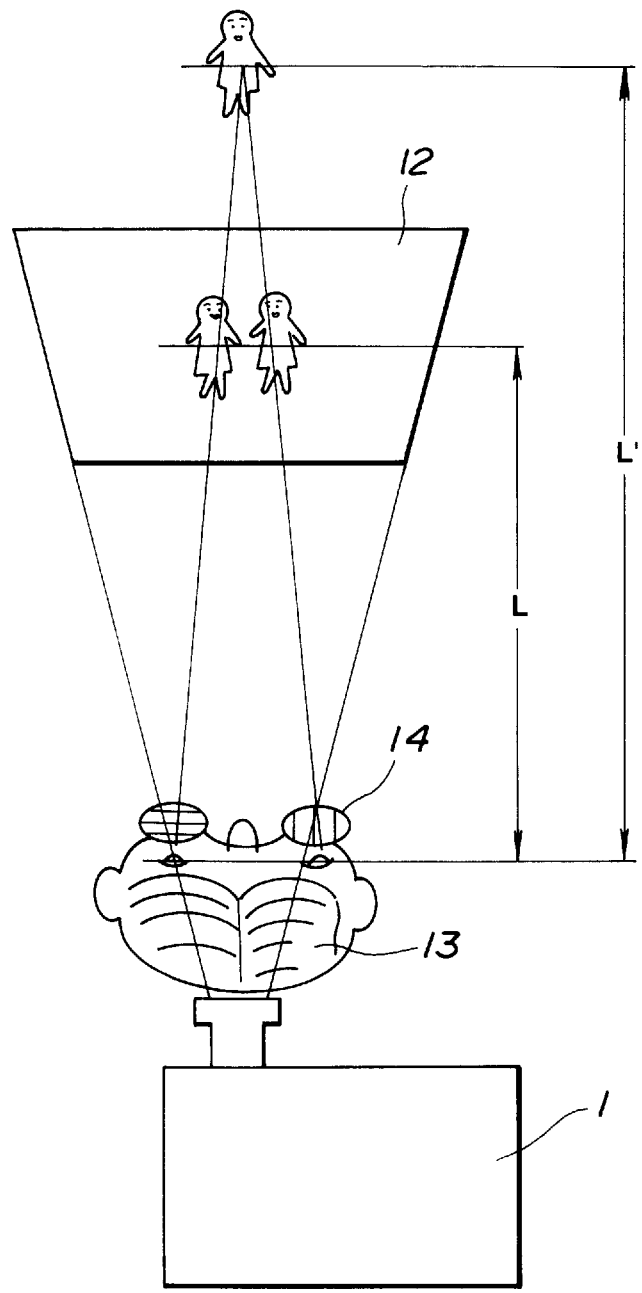
FIG. 6 is a view similar to FIG. 5D, explaining the principle for obtaining a pseudo-stereoscopic vision.

Referring to FIGS. 5A–5D, the input two-dimensional image signal is read out of the first FIFO 24 for each video field through the following process. Cut out partly an image as shown in FIG. 5A, and enlarge it to fill the screen; make images in the areas enclosed by broken lines in FIGS. 5B and 5C corresponding to images for pseudo right and left eyes, and enlarge them to fill the screen; and make the two images offset on the screen substantially by a distance d between the right and left eyes as shown in FIG. 5D. Referring to FIG. 5D, when seeing the image with the polarizing glasses 14, the right eye can see a right image a, and the left eye can see a left image b, obtaining a pseudo-stereoscopic vision as shown in FIG. 6.

In the first embodiment, the three liquid-crystal display boards 7R, 7G, 7B are used for the three colors of R, G, and B, respectively. Alternatively, two liquid-crystal display boards may be used for two colors of, e.g. G and RB.

Figure 7:
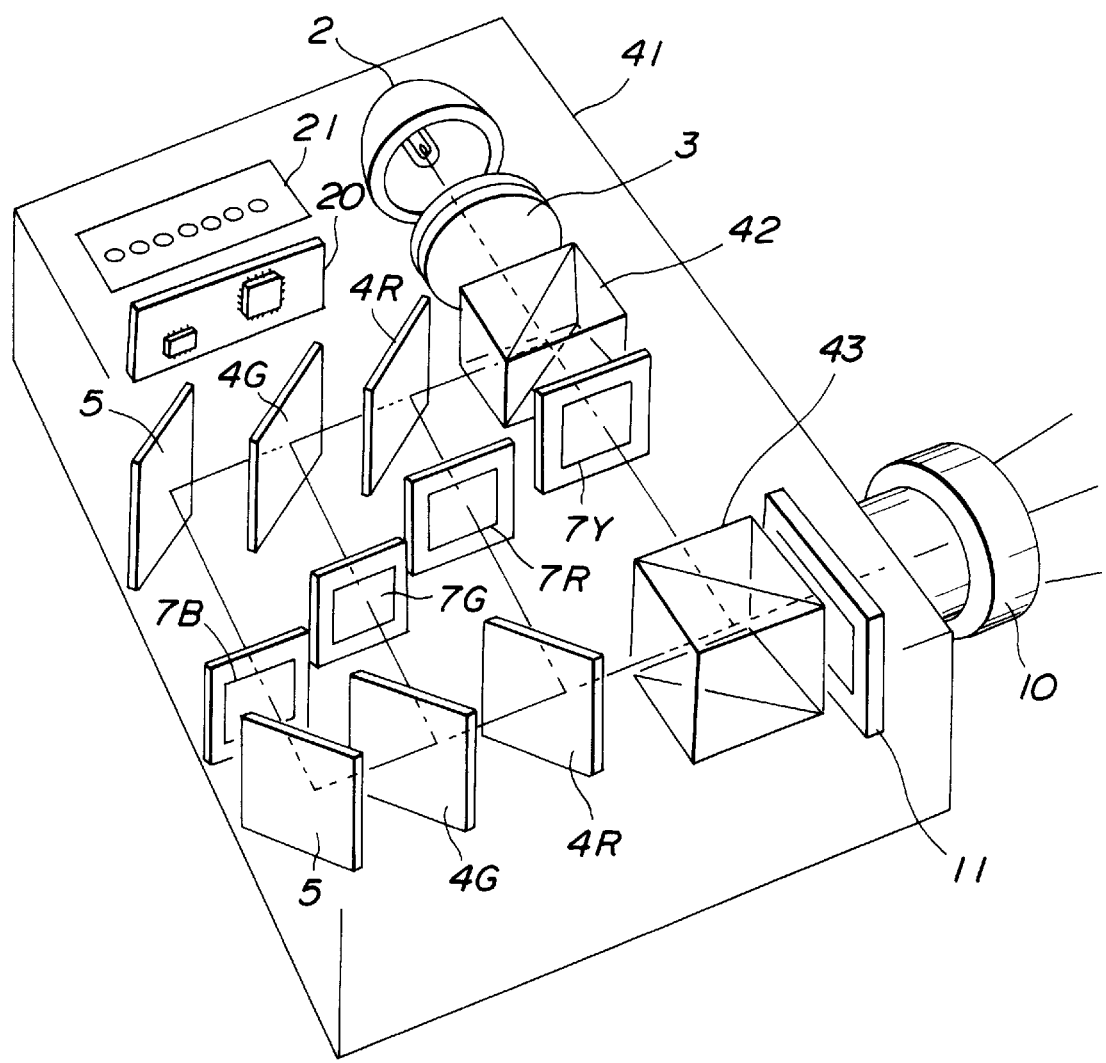
FIG. 7 is a view similar to FIG. 1, showing a second embodiment of the present invention.

FIGS. 7–10 show a second embodiment of the present invention. Referring to FIG. 7, an image projecting apparatus 41 comprises a lamp 2 with reflecting mirror, a lens array 3, a first polarizing prism or polarizing beam splitter 42, a pair of dichroic mirrors 4R, 4G, a pair of plane reflecting mirrors or plates 5, four liquid-crystal display boards 7Y, 7R, 7G, 7B, a second polarizing prism 43, a ferroelectric liquid crystal (FLC) 11, and a projecting lens 10. The first polarizing prism 43 disperses incident light into passing light and reflecting light, the former forming transverse linear polarized light, and the latter forming longitudinal linear polarized light.

Figure 8:
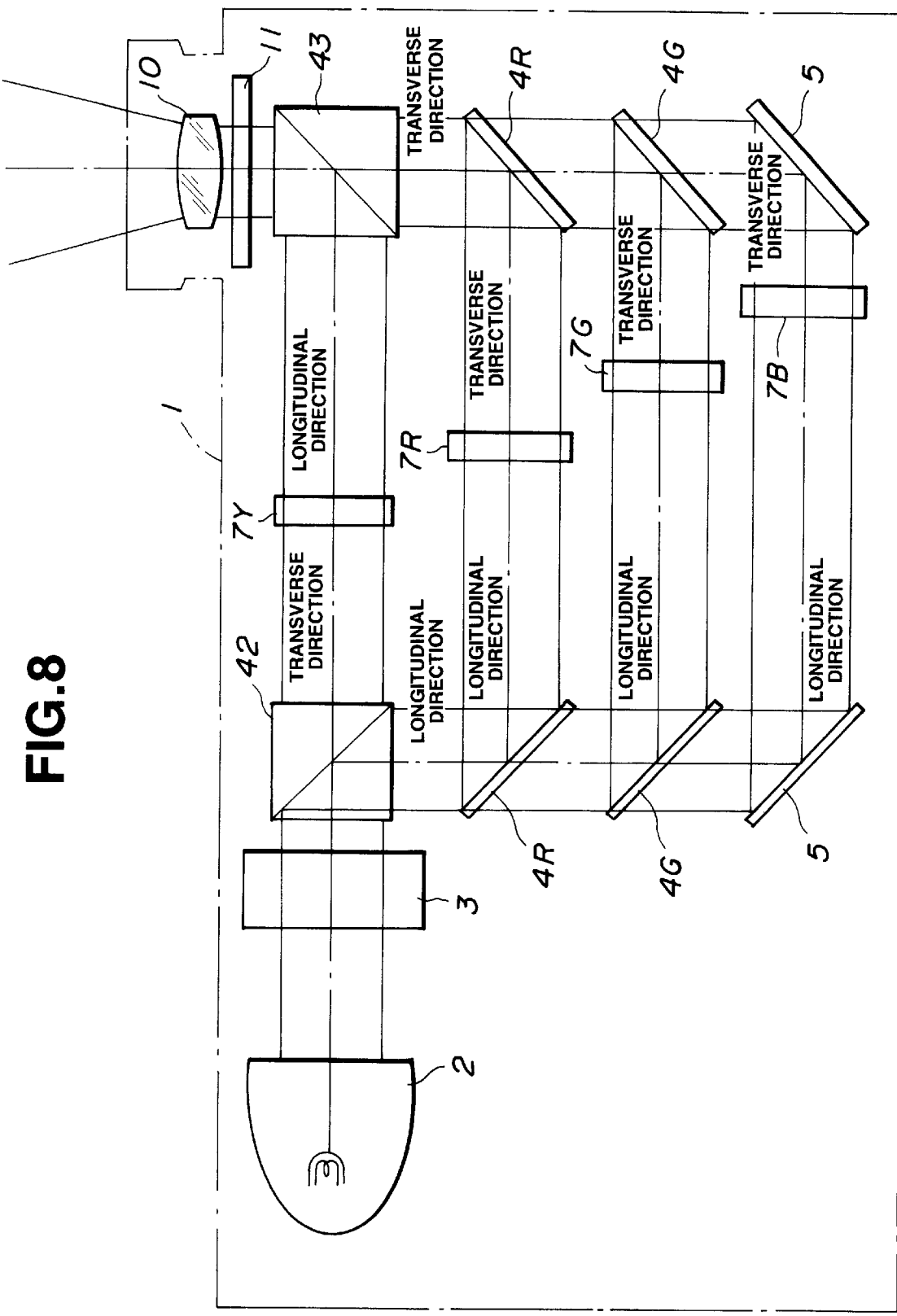
FIG. 8 is a view similar to FIG. 6, showing an optical arrangement of the image projecting apparatus in FIG. 7.

Referring to FIG. 8, light emitted from the lamp 2 with reflecting mirror passes through the lens array 3 to form parallel light, which is incident on the first polarizing prism 42. Transverse polarized light which passed through the first polarizing prism 42 is incident on the liquid-crystal display board 7Y for brightness or black-and-white, whereas longitudinal polarized light which was reflected by the first polarizing prism 42 is incident on the liquid-crystal display boards 7R, 7G, 7B for the colors of R, G, and B. Light which passed through the liquid-crystal display board 7Y becomes projecting light for an image of brightness or black-and-white corresponding to longitudinal linear polarized light, which is incident on the second polarizing prism 43. Lights which passed through the liquid-crystal display boards 7R, 7G, 7B become projecting lights for images of the colors of R, G, and B corresponding to transverse linear polarized light, which are incident on the second polarizing prism 43. Projecting lights united by the second polarizing prism 43 are projected on a screen 12 (see FIG. 9). The FLC 11 is constructed in the same way as that in the first embodiment.

Figure 9:
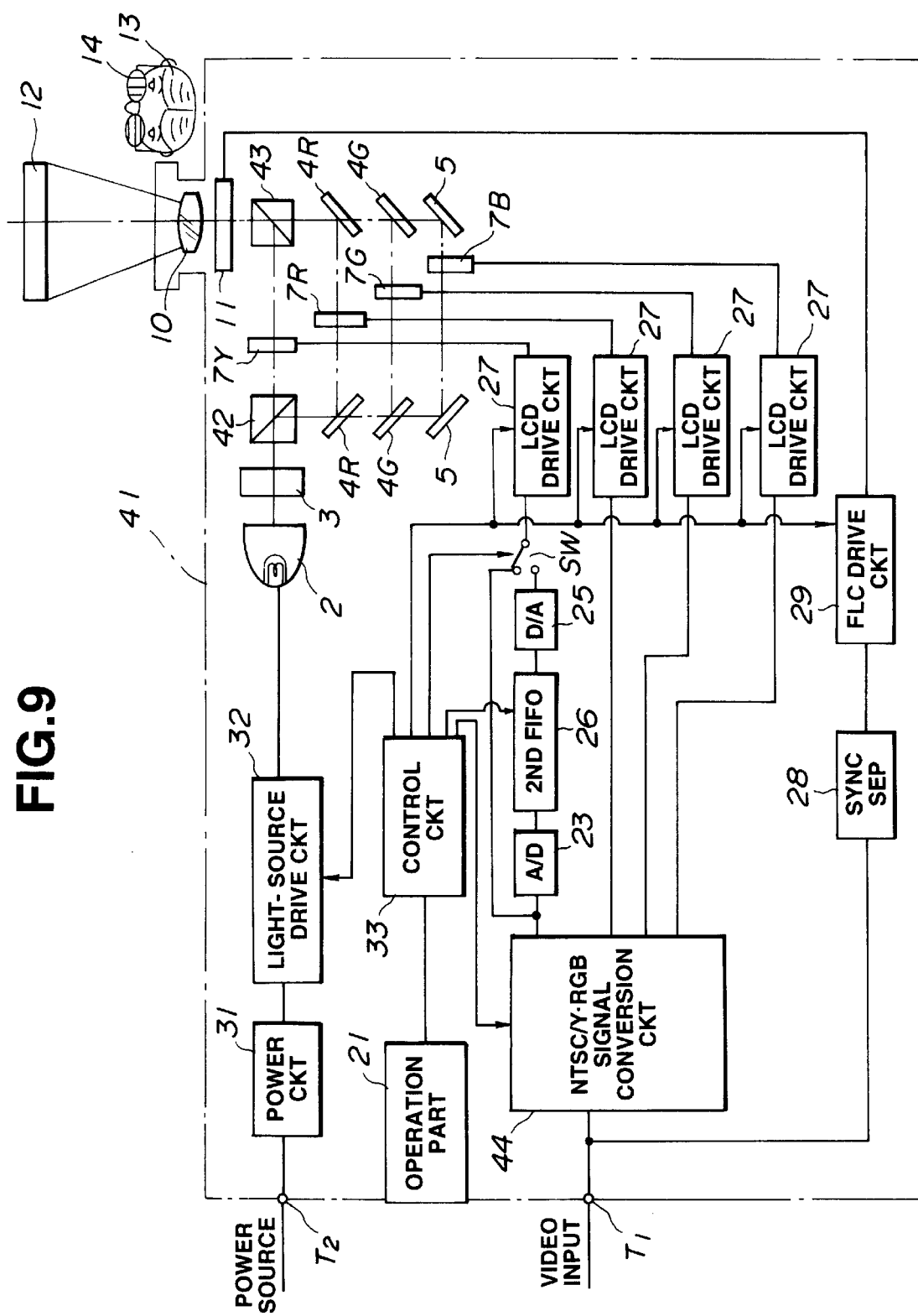
FIG. 9 is a view similar to FIG. 3, showing an electric circuit of the image projecting apparatus in FIG. 7.

Referring to FIG. 9, the electric circuit in the second embodiment is constructed substantially in the same way as that in the first embodiment except that: In place of the NTSC/RGB conversion circuit, an NTSC/Y·RGB conversion circuit 44 is arranged which converts an NYSC-mode image signal into a brightness signal and R, G, and B color signals; and no first FIFO is arranged, and a second FIFO 26 is disposed on the route of a brightness signal so that the brightness signal which passed through a selector switch SW is provided to an LCD drive circuit 27 for brightness.

Figure 10:
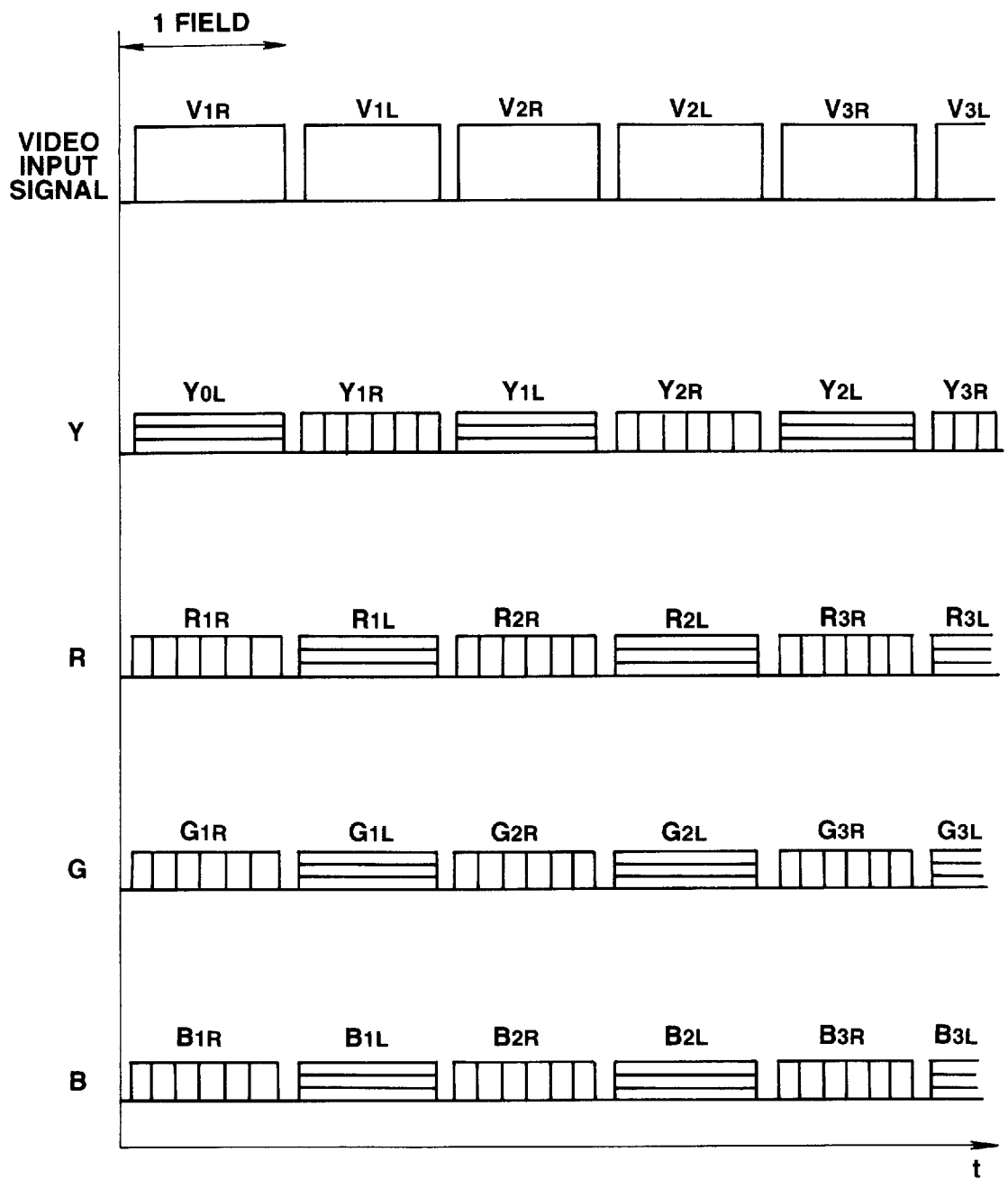
FIG. 10 is a view similar to FIG. 4, showing a projecting timing and a polarization of projecting light.

The operation of the second embodiment will be described. When inputting a field sequential stereoscopic-image signal so called, an operator selects a stereoscopic-image mode with an operation part 21. Then, a control circuit 33 controls the second FIFO 26 to output an input signal with delay of a period of one video field, and the selector switch SW to select the route of the second FIFO 26. The input stereoscopic-image signal is divided into a brightness signal and R, G, and B color signals by the NTSC/Y.RGB conversion circuit 44, which are input to the second FIFO 26 to delay only the brightness signal by one video field. The brightness signal and the R, G, and B color signals processed in such a way are converted into projecting light by the liquid-crystal display boards 7Y, 7R, 7G, 7B, which is projected by the FLC 11 for each video field with the direction of polarization not changed or rotated by 90°. FIG. 10 shows a projection timing and a polarization of projecting light. Referring to FIG. 4, polarizing glasses 14 having a right lens for longitudinal polarized light and a left lens for transverse polarized light allow a viewer 13 to see an image for right eye by the right eye, and an image for left eye by the left eye. Projecting light produced by the brightness signal and that produced by the R, G, and B color signals are alternatively seen in accordance with a period of a field time-shared, obtaining a stereoscopic vision with less flicker.

According to the second embodiment, light of a light source 2 is dispersed longitudinally and transversely and united by using the polarizing prisms 42, 43 without light loss, resulting in increased efficiency. Moreover, additional arrangement of the liquid-crystal display board 7Y having high resolution for displaying the brightness or black-and-white allows improvement of the picture quality.

In the second embodiment, the four liquid-crystal display boards 7Y, 7R, 7G, 7B are used for a brightness signal and R, G, and B color signals. Alternatively, two liquid-crystal display boards may be used, one for a brightness signal and one for R, G, and B color signals.

Figure 11:
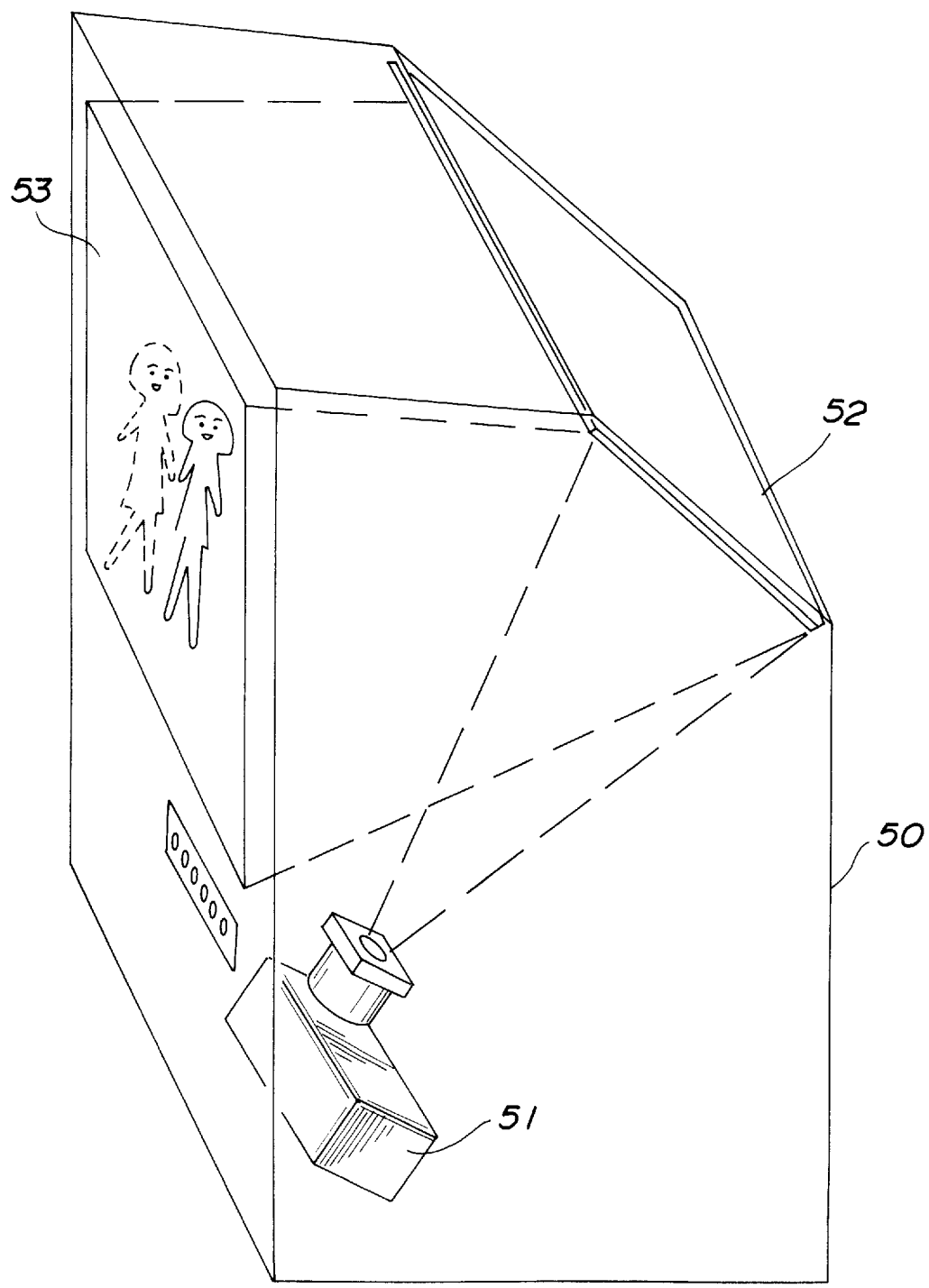
FIG. 11 is a schematic perspective view showing a third embodiment of the present invention.
Figure 12:
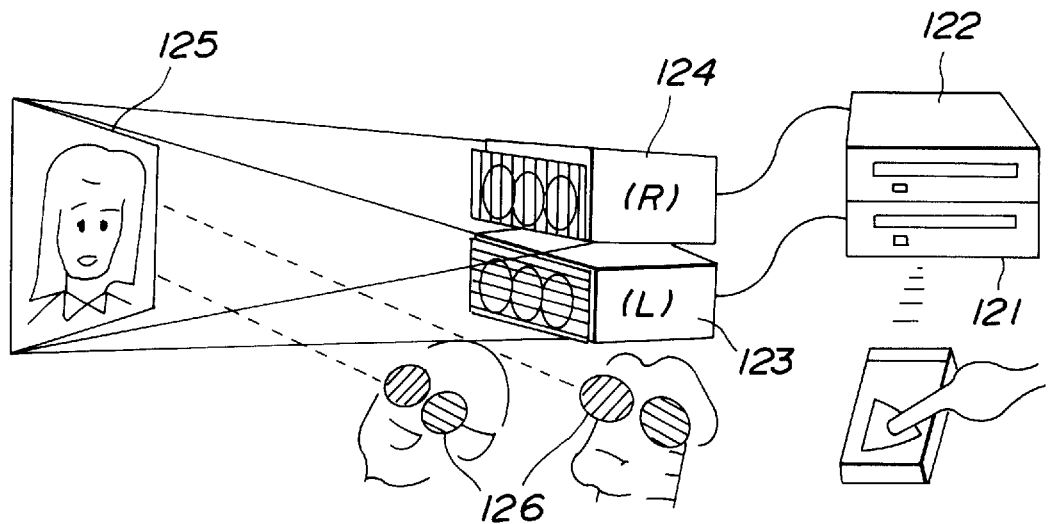
FIG. 12 is a view similar to FIG. 11, showing one conventional image projecting apparatus.
Figure 13:
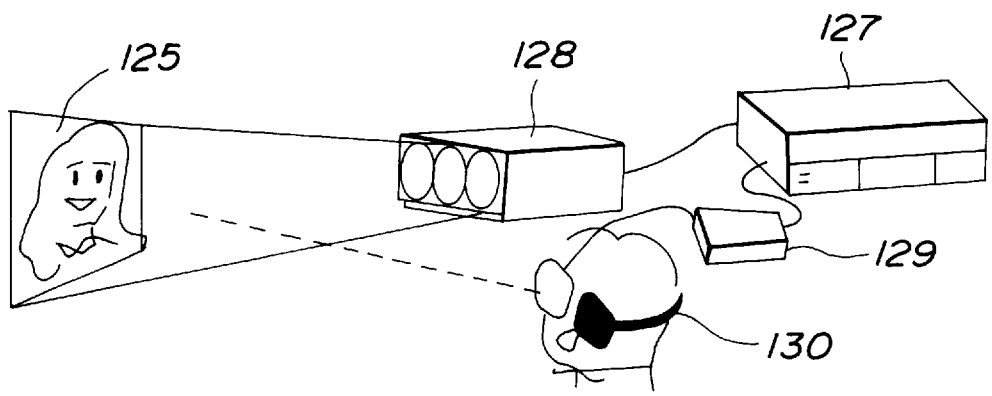
FIG. 13 is a view similar to FIG. 12, showing another conventional image projecting apparatus.

FIG. 11 shows a third embodiment of the present invention. Referring to FIG. 11, an image projecting apparatus is of the rear projection type, and comprises a casing 50 and an image projector 51 accommodated therein. The image projector 51 is constructed in the same way as the image projecting apparatus 1, 41 in the first and second embodiments. Projecting light out of the image projector 51 is reflected by a plane reflecting mirror or plate 52, which is projected on the back of a transparent screen 53. When seeing the transparent screen 53 from the front side with the above polarizing glasses, a viewer can obtain a stereoscopic image with less flicker.

Having described the present invention in connection with the preferred embodiments, it is noted that the present invention can be available with circular polarization in place of linear polarization as described therein.

What is claimed is:

1. An image projecting apparatus, comprising:

means for generating a stereoscopic-image signal having images for right and left eyes alternatively arranged for each video field of said image signal;

means responsive to said generating means for decomposing an image produced by said stereoscopic-image signal into lights with predetermined components;

means responsive to said decomposing means for dividing said lights into first and second groups;

means responsive to said dividing means for assigning said first group to a first polarized light having directions of polarization different from each other for each period of said field;

means responsive to said assigning means for assigning said second group to a second polarized light having said directions of polarization different from each other for each period of said field and having a direction of polarization different from that of said first polarized light; and means responsive to said two assigning means for projecting said first and second polarized lights, said second polarized light being delayed by one video field with respect to said first polarized light.

2. An image projecting apparatus as claimed in claim 1, wherein said lights include red, green, and blue lights.

3. An image projecting apparatus as claimed in claim 1, wherein said first group includes red and blue lights, and said second group includes a green light.

4. An image projecting apparatus as claimed in claim 1, wherein said first and second polarized lights include linear polarized lights perpendicular to each other.

5. An image projecting apparatus as claimed in claim 1, wherein said first and second polarized lights include circular polarized lights having directions of rotation opposite to each other.

6. An image projecting apparatus as claimed in claim 2, wherein said lights further include a brightness light.

7. An image projecting apparatus as claimed in claim 1, wherein said first group includes red, green, and blue lights, and said second group includes a brightness light.

8. An image projecting apparatus as claimed in claim 1, further comprising:

a screen having a back for receiving said first and second polarized lights.

9. An image projecting apparatus, comprising:

means for generating a two-dimensional signal having an image arranged for each video field of said signal;

means responsive to said generating means for decomposing an image produced by said two-dimensional signal into lights with first and second images transversely offset with each other on a screen and constituting images for pseudo right and left eyes alternatively switched for each video field;

means responsive to said decomposing means for assigning first image to a first polarized light having directions of polarization different from each other for each period of said field;

means responsive to said assigning means for assigning said second image to a second polarized light having said directions of polarization different from each other for each period of said field and having a direction of polarization different from that of said first polarized light; and means responsive to said two assigning means for projecting said first and second polarized lights, said second polarized light being delayed by one video field with respect to said first polarized light.

10. A method of projecting an image, comprising the steps of:

generating a stereoscopic-image signal having images for right and left eyes alternatively arranged for each video field of said image signal;

decomposing an image produced by said stereoscopic-image signal into lights with predetermined components;

dividing said lights into first and second groups;

assigning said first group to a first polarized light having directions of polarization different from each other for each period of said field;

assigning said second group to a second polarized light having said directions of polarization different from each other for each period of said field and having a direction of polarization different from that of said first polarized light; and projecting said first and second polarized lights, said second polarized light being delayed by one video field with respect to said first polarized light.

11. A method as claimed in claim 10, wherein said lights include red, green, and blue lights.

12. A method as claimed in claim 10, wherein said first group includes red and blue lights, and said second group includes a green light.

13. A method as claimed in claim 10, wherein said first and second polarized lights include linear polarized lights perpendicular to each other.

14. A method as claimed in claim 10, wherein said first and second polarized lights include circular polarized lights having directions of rotation opposite to each other.

15. A method as claimed in claim 11, wherein said lights further include a brightness light.

16. A method as claimed in clam 10, wherein said first group includes red, green, and blue lights, and said second group includes a brightness light.

17. A method of projecting an image on a screen, comprising the steps of:

generating a two-dimensional signal having an image arranged for each video field of said signal;

decomposing an image produced by said two-dimensional signal into lights with first and second images transversely offset with each other on the screen and constituting images for pseudo right and left eyes alternatively switched for each video field;

assigning first image to a first polarized light having directions of polarization different from each other for each period of said field;

assigning said second image to a second polarized light having said directions of polarization different from each other for each period of said field and having a direction of polarization different from that of said first polarized light; and projecting said first and second polarized lights, said second polarized light being delayed by one video field with respect to said first polarized light.

* * * * *